July 2, 1968     M. C. CROCKER II     3,390,847
EARTH'S ORIENTATION OF SATELLITE ANTENNA
Filed May 19, 1966
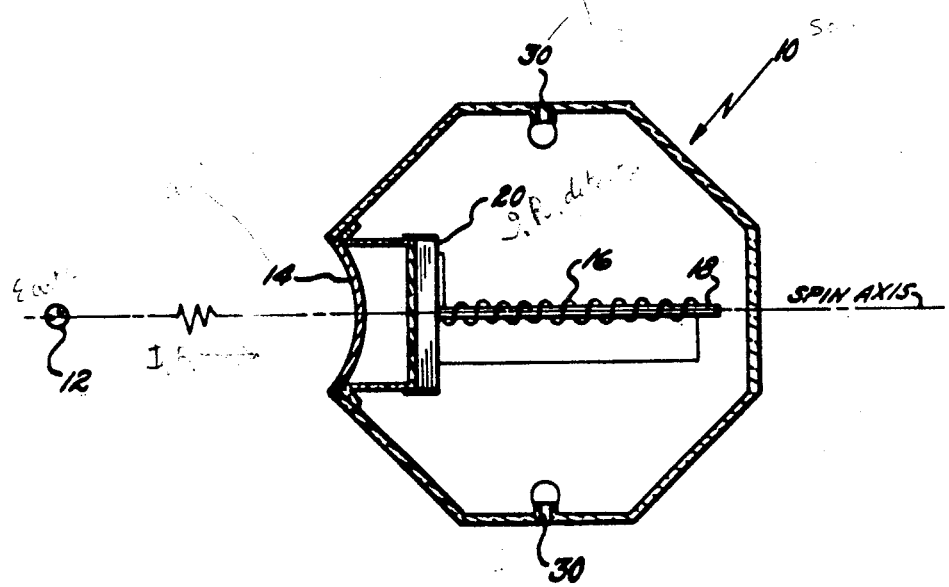
INVENTOR.
MILLERD CHANDLER CROCKER II
BY Harry A. Herbert Jr.
Sherman H. Goldman
ATTORNEYS 3,390,847
EARTH'S ORIENTATION OF SATELLITE ANTENNA
Millerd Chandler Crocker II, Lexington, Mass., assignor to the United States of America as represented by the Secretary of the Air Force
Filed May 19, 1966, Ser. No. 551,862
4 Claims. (Cl. 244—1)

ABSTRACT OF THE DISCLOSURE

A spin stabilized satellite vehicle having an antenna oriented toward the earth at all times in a synchronous equatorial orbit by means of a torquing rod oriented parallel to the spin axis and an infrared detection system connected with the torquing rod to produce a magnetic moment which reacts with the earth's magnetic field.

---

This invention relates generally to orienting means for a spin stabilized satellite vehicle and, more particularly, to the orientation of a satellite vehicle having an antenna which is desired to be directed toward the earth at all times in a synchronous equatorial orbit.

The device of this invention utilizes a set of magnetic rods, together with an earth seeking system for precessing the spin axis of the satellite around the average direction of the magnetic field such that the spin axis of the satellite is always colinear with the earth satellite vector. The antenna of the satellite is mounted such that its axis of symmetry is colinear with the spin axis of the satellite.

Currently utilized space satellite vehicles require ground control from the earth in order to actuate mechanisms on the satellite in order to properly orient an antenna in order to have it directed toward the earth. The expense and complexity of the presently used systems render them uneconomical for commercial applications of satellites.

Accordingly, it is an object of this invention to provide an antenna carrying satellite which has the antenna directed toward the earth at all times in a synchronous equatorial orbit.

It is another object of this invention to provide a magnetic torquing means for orienting an orbital satellite such that its spin axis precesses around the average direction of the magnetic field with the spin axis colinear with the earth satellite vector.

It is still another object of this invention to provide a magnetic torquing device for an orbiting satellite operated by an infrared control system which together with a satellite de-spinning device can orient the satellite for single antenna beaming toward earth.

These and other advantages, features and objects of the invention will become more apparent from the following description taken in connection with the illustrative embodiment in the accompanying drawing, wherein the figure comprises a schematic representation of the orbiting satellite containing the torquing coil sensing means of this invention.

Referring to the figure, there is shown a satellite 10 which orbits around the earth 12 with its spin axis directed toward the earth. An antenna 14, transparent to infrared and formed in the skin of the satellite, is required to be directed toward the earth all of the time in a synchronous equatorial orbit. As shown in the diagram, the spin axis of the satellite precesses around the average north-south direction of the magnetic field (which would be perpendicular to the drawing) such that the spin axis of the satellite is colinear with the earth's satellite vector. The antenna 14 is mounted such that its axis of symmetry is colinear with the spin axis of the satellite.

Coil 16 is mounted on a core 18 which is of a very soft magnetic material with high intrinsic magnetization (such as Supermendur) to form a torquing rod. The operation of the torquing rod is explained in the copending application of Millerd Chandler Crocker II and Edward A Vrablik, Ser. No. 551,867, filed on even date herewith and titled "Magnetic Torquing of Spin Axis Stabilization."

Connected with the torquing rod 16–18, which should be parallel with the spin axis of the vehicle 10, is a conventional infrared detector 20 which is responsive to infrared from the earth to generate a current in the torquing rod. As explained in the aforementioned copending application, the direction of current in the coil determines the direction of the correcting torque. The torquing rod 16–18 is capable of producing a magnetic moment of 29 amp-m.$^2$. Since the magnetic field in a synchronous orbit is $10^{-7}$ webers/m.$^2$, a torque production of $29 \times 10^{-7}$ N.M. perpendicular to the direction of the magnetic field is possible, therefore, precessing of the spin axis of the satellite may be effected at a rate of 15°/hour to keep the spin axis pointed at the earth. Assuming a moment of inertia of 1 kg.-m.$^2$, the satellite will have to rotate at .38 r.p.m. and conventional jet 30 means which would de-spin the satellite to this rotation would be required.

As the satellite orbits the earth with an initial orientation that has the antenna angularly displaced from alignment with the earth, there will be a position in the orbit where the detector 20 will be directed at the earth and generate a current in coil 16 in the proper direction based on its orbital direction to cause the satellite to precess at a rapid rate about an axis which is perpendicular to the spin axis. As the satellite moves from the alignment of its antenna with the earth, the current in the coil drops rapidly and the satellite maintains a slight precession which keeps pace with its rotation about the earth.

From the foregoing, it should be apparent that there has been presented a means for orienting an earth's satellite such that its antenna will be directed toward the earth all of the time in a synchronized equatorial orbit. The system described takes advantage of magnetic moment torquing rods in order to precess the spin axis of the satellite and an infrared control system in order to seek the earth and simultaneously to control the current in the magnetic torquing rods.

Although the invention has been described relative to a particular embodiment, it should be understood to those skilled in the art that the invention is capable of a variety of alternative embodiments. For example, any earth seeking system may be substituted for the conventional infrared detection arrangement, and a plurality of magnetic torquing rods may be substituted for the single rod illustrated in the schematic representation. Accordingly, I intend to be limited only by the spirit and scope of the appended claims.

I claim:
1. Means for precessing the spin axis of a satellite around the average direction of the earth's north-south magnetic field to render the spin axis of the satellite colinear with the earth satellite vector comprising:
   a satellite,
   an antenna mounted externally on said satellite such that its axis of symmetry is colinear with the spin axis of said satellite,
   a magnetic torquing rod mounted within said satellite and having its longitudinal axis oriented parallel to said spin axis, and
   an infrared detection system directed toward the earth connected with said torquing rod to produce a magnetic moment which reacts with the earth's north-south magnetic field to keep said antenna pointed toward the earth.
2. Means as defined in claim 1 wherein said magnetic torquing rod includes a core of a soft magnetic material with high intrinsic magnetization, and a coil around said core and connected with said infrared detection system for current flow therethrough.

3. Means as defined in claim 1 including satellite de-spinning means for synchronizing the equatorial orbit of said satellite to keep said antenna pointed toward the earth.

4. Means as defined in claim 1 including multiple magnetic torquing rods connected with said infrared detection system.

References Cited

UNITED STATES PATENTS

| | | | |
|---|---|---|---|
| 3,030,049 | 4/1962 | Pilkington et al. | 244—1 |
| 3,145,948 | 8/1964 | Kershner | 244—1 |
| 3,228,628 | 1/1966 | Chubb | 244—1 |

FERGUS S. MIDDLETON, *Primary Examiner.*